Figure 1:
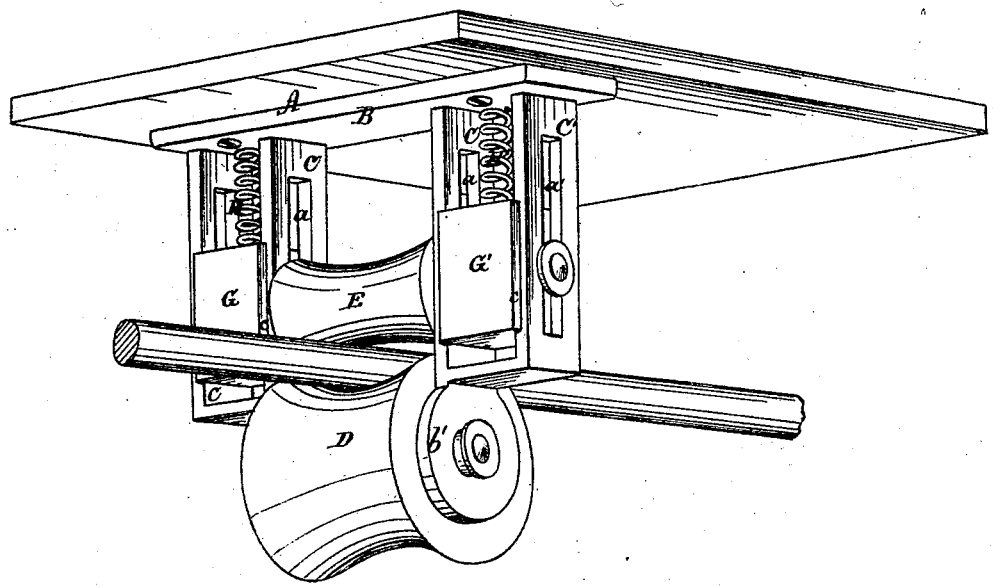

AUGUSTUS W. ROBINSON.
Improvement in Fair Leaders for Steering Rods or Chains.

No. 121,423.　　　　　　　　　　　　Patented Nov. 28, 1871.

Witnesses.　　　　　　　　　　　　Inventor,
Phil. R. Larner　　　　　　　　　　Augustus W. Robinson
Edmund Masson.　　　　　　　　　By Wm. C. Brock
　　　　　　　　　　　　　　　　　　Attorney

UNITED STATES PATENT OFFICE.

AUGUSTUS W. ROBINSON, OF PROVIDENCE, RHODE ISLAND.

IMPROVEMENT IN FAIR-LEADERS FOR STEERING-RODS OR CHAINS.

Specification forming part of Letters Patent No. 121,423, dated November 28, 1871.

*To all whom it may concern:*

Be it known that I, AUGUSTUS W. ROBINSON, of the city and county of Providence, in the State of Rhode Island, have invented a certain new and useful Fair-Leader for Steering-Rods or Chains.

My invention consists in combining with the ordinary pulley of a fair-leader an auxiliary compressing-roller, or its equivalent, by means of which the steering-rod or chain is not only kept in close contact with the pulley, but the pulley itself is kept steady in its bearings and rendered comparatively noiseless in its operation; and I do hereby declare that the following specification, taken in connection with the drawing furnished and forming a part of the same, is a true, clear, and exact description of a convenient and desirable apparatus embodying my invention.

Figure 2:
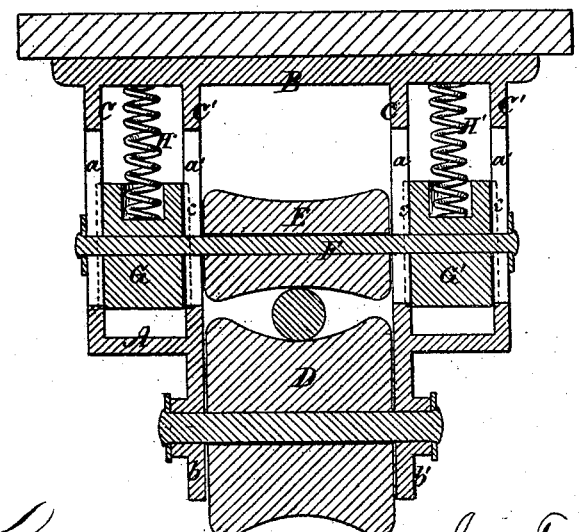

Referring to the drawing, Figure 1 represents one of my improved fair-leaders in perspective. Fig. 2 represents the same in vertical section.

A represents the frame of one of my improved fair-leaders. As shown in the drawing this frame is of peculiar construction. It consists of the top plate B, from which depend the open sections C C', the sides of which are provided with vertical slots $a$ $a'$. D is the ordinary pulley or guide-roller mounted in bearings formed in extensions $b$ $b'$ of the section C. E represents the auxiliary compressing-roller mounted upon an axial-rod, F. The ends of this rod are supported in boxes G G,' placed within the sections C, and capable of a vertically-sliding movement. As shown in the drawing the rod F passes entirely through the roller and boxes, and is held in proper relation to the slots $a$ by means of washers placed upon its ends. The boxes G are guided in their vertical movement partly by means of flanges $c$ $c'$ formed upon each side, and also by the rod F, moving within the slots $a$ $a'$. H and H' are spiral springs one end of which bear against the under side of the plate B, while the opposite ends rest in recesses formed in the upper sides of the boxes G.

It will be perceived that in a fair-leader constructed as above described, when the steering-rod or chain is placed in position upon the pulley D the springs H, acting upon the sliding boxes G, cause the roller E to firmly compress the rod or chain within the groove of the pulley, and while allowing it a free longitudinal movement prevents any jarring or rattling which might occur during the operation of steering.

With the usual and ordinary apparatus for conducting and sustaining the steering-rods or chains the noise occasioned by their constantly rising and falling movement during the operation of steering is particularly objectionable in the cabins of passenger steamers. With my improved fair-leader the operation of steering is practically noiseless.

From the fact that no movement of the steering-chains or rods is permitted other than the longitudinal movement absolutely requisite, much less wear is occasioned to the chains or rods, and also to the fair-leader than would be the case if the ordinary pulleys or rollers were employed.

Having thus described my invention, I claim as new and desire to secure by Letters Patent—

In combination with a guide-roller or pulley an auxiliary or compressing-roller, acting in conjunction therewith and upon the steering-rod or chain, as and for the purpose specified.

AUGUSTUS W. ROBINSON.

Witnesses:
HENRY B. WHITMAN,
F. B. LAWRENCE. (138)